United States Patent
Anders et al.

(10) Patent No.: US 9,803,538 B2
(45) Date of Patent: Oct. 31, 2017

(54) DUCTED COMBUSTION SYSTEMS UTILIZING DUCT STRUCTURES

(71) Applicant: Caterpillar Inc., Peoria, IL (US)

(72) Inventors: Jonathan Anders, Peoria, IL (US); Kenth Svensson, Peoria, IL (US); Bobby John, Peoria, IL (US); Chad Koci, Washington, IL (US); Christopher Gehrke, Chillicothe, IL (US); Glen Martin, Peoria, IL (US); Timothy Bazyn, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 315 days.

(21) Appl. No.: 14/685,295

(22) Filed: Apr. 13, 2015

(65) Prior Publication Data
US 2016/0298529 A1 Oct. 13, 2016

(51) Int. Cl.
| F02B 3/00 | (2006.01) |
| F02F 3/28 | (2006.01) |
| F02B 23/06 | (2006.01) |
| F02F 1/24 | (2006.01) |
| F02B 23/02 | (2006.01) |

(52) U.S. Cl.
CPC .......... F02B 23/0627 (2013.01); F02B 23/02 (2013.01); F02B 23/0648 (2013.01); F02F 1/24 (2013.01); *Y02T 10/125* (2013.01)

(58) Field of Classification Search
CPC .. F02B 23/0627; F02B 23/02; F02B 23/0648; F02F 1/24
See application file for complete search history.

(56) References Cited

U.S. PATENT DOCUMENTS

| 1,865,841 A | * | 7/1932 | Cummins | F02B 23/0627 |
| | | | | 123/26 |
| 3,057,334 A | * | 10/1962 | Bailey | F02B 23/0651 |
| | | | | 123/269 |
| 3,209,735 A | * | 10/1965 | Clarke | F02B 23/0651 |
| | | | | 123/193.6 |
| 3,950,056 A | | 4/1976 | Bowen | |

(Continued)

FOREIGN PATENT DOCUMENTS

| FR | 2895019 A1 | 6/2007 |
| JP | 59120715 A | 7/1984 |

(Continued)

*Primary Examiner* — Hieu T Vo
*Assistant Examiner* — Arnold Castro
(74) *Attorney, Agent, or Firm* — Miller, Matthias & Hull LLP

(57) ABSTRACT

A ducted combustion system is disclosed. The ducted combustion system includes a combustion chamber bound by a flame deck surface of a cylinder head of an internal combustion engine and by a piston top surface of a piston disposed within the internal combustion engine. The system includes a fuel injector including a plurality of orifices, the plurality of orifices injecting fuel into the combustion chamber as a plurality of fuel jets. The system includes a duct structure defining a plurality of ducts and disposed within the combustion chamber between the flame deck surface and the piston top surface, the plurality of ducts being disposed such that each of the plurality of fuel jets at least partially enters one of the plurality of ducts upon being injected into the combustion chamber.

16 Claims, 9 Drawing Sheets

(56) References Cited

U.S. PATENT DOCUMENTS

| | | | |
|---|---|---|---|
| 3,963,001 A | 6/1976 | Kruckenberg et al. | |
| 3,980,056 A | 9/1976 | Kraus | |
| 5,224,458 A | 7/1993 | Okada et al. | |
| 6,095,437 A | 8/2000 | Nozawa | |
| 6,725,824 B2 | 4/2004 | Donauer et al. | |
| 7,143,738 B2 * | 12/2006 | Ganz | F02B 17/00 |
| | | | 123/295 |
| 7,213,564 B2 | 5/2007 | Hill et al. | |
| 8,677,970 B2 * | 3/2014 | Venugopal | F02B 23/0651 |
| | | | 123/193.1 |
| 2010/0275878 A1 | 11/2010 | Phillips | |
| 2012/0186555 A1 * | 7/2012 | Mueller | F02B 3/00 |
| | | | 123/294 |
| 2016/0097360 A1 | 4/2016 | Mueller | |
| 2016/0298528 A1 * | 10/2016 | Svensson | F02B 23/0669 |
| 2016/0298529 A1 * | 10/2016 | Anders | F02B 23/0627 |
| 2016/0298531 A1 * | 10/2016 | Anders | F02B 23/00 |
| 2016/0298583 A1 * | 10/2016 | Anders | F02M 55/00 |
| 2016/0298584 A1 * | 10/2016 | Svensson | F02F 1/24 |
| 2016/0327000 A1 * | 11/2016 | John | F02M 61/14 |
| 2017/0009712 A1 * | 1/2017 | Svensson | F02F 1/24 |
| 2017/0016384 A1 * | 1/2017 | Koci | F02B 23/10 |
| 2017/0089310 A1 * | 3/2017 | Svensson | F02M 55/00 |

FOREIGN PATENT DOCUMENTS

| | | |
|---|---|---|
| JP | 05106441 A | 4/1993 |
| JP | 0826770 B2 | 3/1996 |
| JP | 3695011 B2 | 9/2005 |
| WO | 9110825 A1 | 7/1991 |

* cited by examiner

DUCTED COMBUSTION SYSTEMS UTILIZING DUCT STRUCTURES

TECHNICAL FIELD

The present disclosure generally relates to internal combustion engines and, more particularly, relates to ducted combustion systems for internal combustion engines.

BACKGROUND

Modern combustion engines may include one or more cylinders as part of the engine. The cylinder and an associated piston may define a combustion chamber therebetween. Within the combustion chamber, fuel for combustion is directly injected into the combustion chamber by, for example, a fuel injector, which is associated with the cylinder and has an orifice disposed such that it can directly inject fuel into the combustion chamber.

Different mixtures and/or equivalence ratios of the fuel/air mixture within the fuel jet may produce different results during combustion. The manners in which the injected fuel mixes and/or interacts with the air and other environmental elements of the combustion chamber may impact combustion processes and associated emissions. Further, if the fuel and air mixing is inadequate, then suboptimal or abnormally large amounts of soot may form within the combustion chamber.

To aid in preventing or reducing soot formation and to increase efficiency in such combustion engines, systems and methods for ducted combustion have been developed. For example, U.S. Patent Publication No. 2012/0186555 ("Ducted Combustion Chamber for Direct Injection Engines and Method") discloses ducted combustion within a combustion engine. The ducts of the '555 application generally include fins disposed around a fuel jet injected by a fuel injector. Such ducts may form a passageway corresponding to an orifice of the fuel injector, into which fuel jets are injected. The fuel jets may be channeled into the ducts, which may improve fuel combustion because upstream regions of a direct-injected fuel jet may be affected by faster and more uniform mixing as well as by an inhibition or reduction of entrainment of combustion products from downstream regions of the same or neighboring jets.

While the teachings of the '555 application are advantageous in providing an improved fuel/air mixture, further improvements in fuel/air mixtures are always desired, as such improvements may further reduce emissions and soot formation. Therefore, systems and methods for ducted combustion that utilize generally conical shaped duct structures, defining a plurality of ducts, for improving fuel/air mixtures are desired.

SUMMARY

In accordance with one aspect of the disclosure, a ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including a plurality of orifices in an injector tip of the fuel injector, the plurality of orifices injecting fuel into the combustion chamber as one or more fuel jets. The system may further include a duct structure that defines a plurality of ducts, the plurality of ducts disposed within the combustion chamber between the flame deck surface and the piston top surface, the plurality of ducts being disposed such that each of the plurality of fuel jets at least partially enters one of the plurality of ducts upon being injected into the combustion chamber.

In accordance with another aspect of the disclosure, an internal combustion engine is disclosed. The internal combustion engine may include an engine block having at least one cylinder bore. The internal combustion engine may further include a cylinder head having a flame deck surface disposed at one end of the cylinder bore. The internal combustion engine may further include a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface. The internal combustion engine may further include a fuel injector in fluid connection with the combustion chamber and including a plurality of orifices in an injector tip of the fuel injector, the plurality of orifices injecting fuel into the combustion chamber as one or more fuel jets. The internal combustion engine may further include a duct structure that defines a plurality of ducts, the plurality of ducts disposed within the combustion chamber between the flame deck surface and the piston top surface, the plurality of ducts being disposed such that each of the plurality of fuel jets at least partially enters one of the plurality of ducts upon being injected into the combustion chamber.

In accordance with yet another aspect of the disclosure, a method for operating a combustion system is disclosed. The method may include injecting a plurality of fuel jets into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine. The method may further include directing the plurality of fuel jets, at least partially, into respective members of a plurality of ducts, each of the plurality of ducts being defined within a generally conical shaped duct structure, to provide a substantially uniform mixture of fuel and air within the fuel jets.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
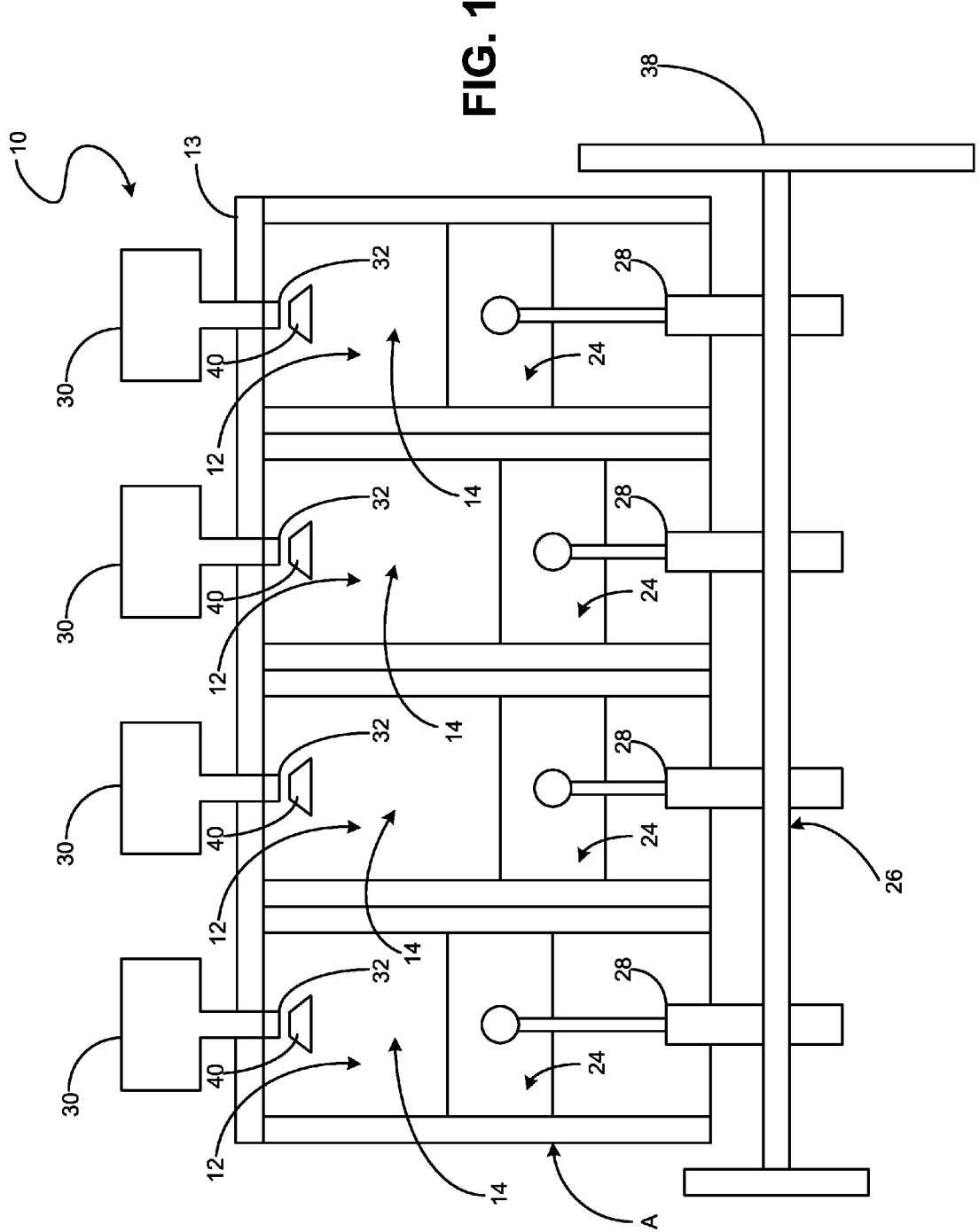
FIG. 1 is a side cross-sectional view of an internal combustion engine, in accordance with an embodiment of the present disclosure.

Turning now to the drawings and with specific reference to FIG. 1, a combustion engine 10 is shown. The engine 10 may be an internal combustion engine having a plurality of cylinders 12. For example, the cylinders 12 may be defined as cylinder bores within an engine block 13 of the engine 10. Each of the plurality of cylinders 12 includes a combustion chamber 14. Each combustion chamber 14 may have a generally cylindrical shape, in accordance with the general shape of the cylinder 12.

Figure 2:
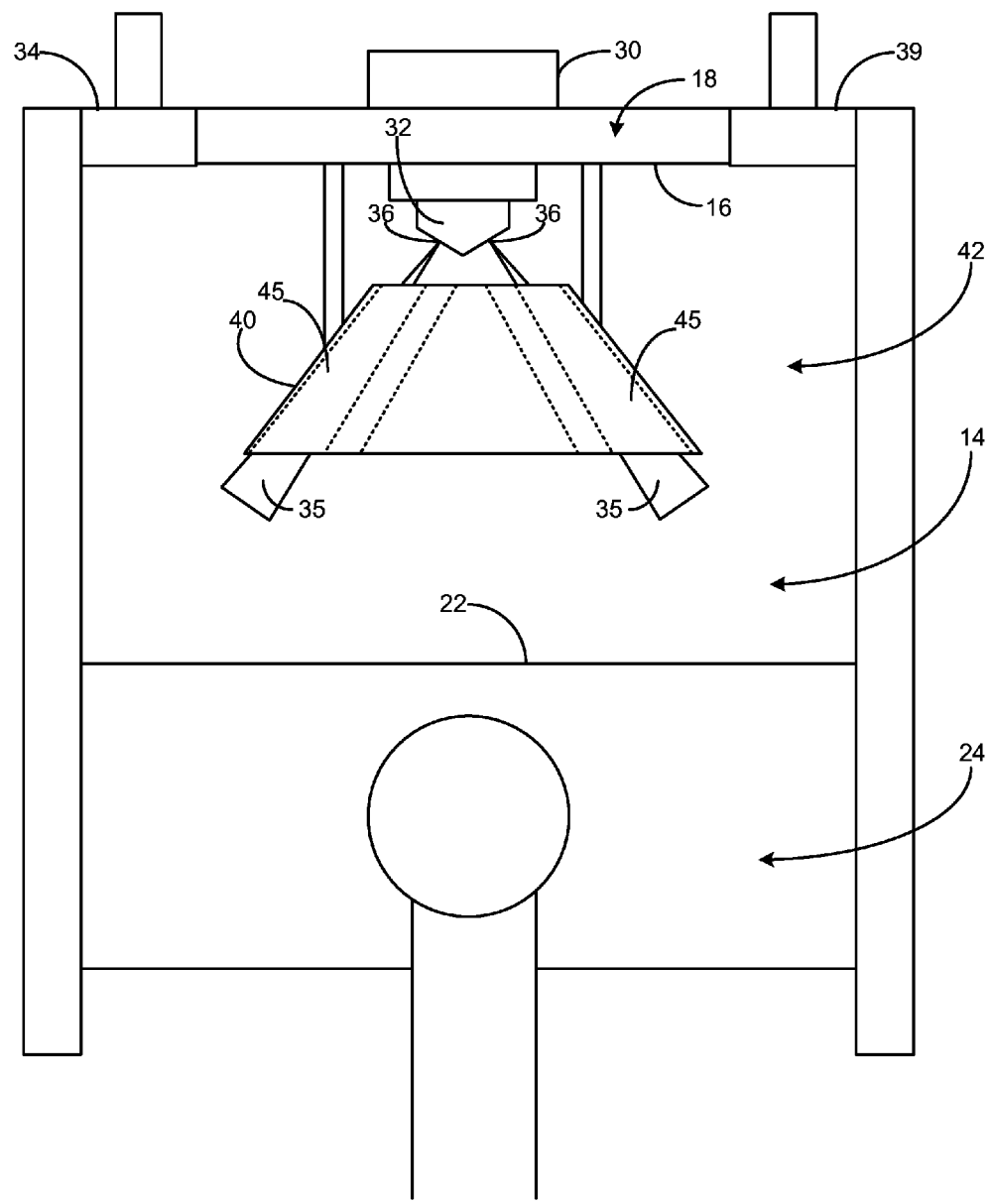
FIG. 2 is a front, cross-sectional view of a cylinder of the internal combustion engine of FIG. 1, as shown taken from the reference notation "A" of FIG. 1, in accordance with the present disclosure.

The combustion chamber 14 is shown in greater detail in the front, cross-sectional view of FIG. 2. As shown in FIG. 2, and with continued reference to FIG. 1, the combustion chamber 14 may be bound at one end by a flame deck surface 16 of a cylinder head 18 of each cylinder 12. The combustion chamber 14 may be further bound at a second end by a piston top surface 22 of a piston 24. The piston 24 is reciprocally disposed within the bore and, as shown in FIG. 1, is connected to a crankshaft 26 via a connecting rod 28. A fuel injector 30 is in fluid connection with the combustion chamber 14 and may be mounted in the cylinder head 18. The fuel injector 30 includes a tip 32 that protrudes within the combustion chamber 14 through the flame deck surface 16. Therefore, the fuel injector 30, via the tip 32, can directly inject fuel into the combustion chamber 14 as, for example, one or more fuel jets.

During operation of the engine 10, air enters the combustion chamber 14 via one or more intake valves 34 (shown in FIG. 2). Air is able to enter the combustion chamber 14 when the intake valves 34 are open during an intake stroke and/or at the end of an exhaust stroke and/or at the beginning of a compression stroke. When air is present in the combustion chamber 14, the fuel injector 30, via the tip 32, will inject high pressure fuel through orifices 36 of the tip 32 as fuel jets 35. The fuel jets 35 may generally disperse within the combustion chamber 14 to create a fuel/air mixture within the combustion chamber 14. Ignition produces combustion, which, in turn, provides work on the piston 24 to produce motion upon the crankshaft 26 to drive an output 38. Following combustion, exhaust gas may be expelled from the combustion chamber 14 via one or more exhaust valves 39, when said exhaust valves 39 are open during an exhaust stroke and/or at the end of a power stroke and/or at the beginning of an intake stroke of the engine 10.

Within the combustion chamber 14, uniformity of the fuel/air mixture may be relevant to the combustion efficiency and may be relevant to the amount and type of combustion byproducts that are formed. For example, if the fuel/air mixture is too rich in fuel due to insufficient mixing within the fuel jets 35, then higher soot emissions may occur within the combustion chamber 14 and/or combustion efficiency may be affected. However, using a generally conical shaped duct structure 40, which defines a plurality of ducts 45, disposed within the combustion chamber 14 may provide for more uniform fuel/air mixing within fuel jets 35. Using such a duct structure 40, which defines a plurality of ducts 45, a lift-off length of a flame associated with a fuel jet 35 may be altered (extended or reduced) to achieve an optimized lift-off length. The duct structure 40 may alter lift-off length due to energy exchange between the duct structure 40 and the fuel/air mixture of the fuel jet 35, due to altering fluid dynamics of the fuel/air mixture of the fuel jet 35, and/or due to prevention of lift-off length recession by acting as a flame arrester.

The duct structure 40 may be disposed within a flame region 42 of the combustion chamber 14. The flame region 42 may be defined as a region of the combustion chamber 14 extending from the flame deck surface 16 to the piston top surface 22, when the piston 24 is at or close to a maximum compression distance or top dead center (TDC) position.

Figure 3:
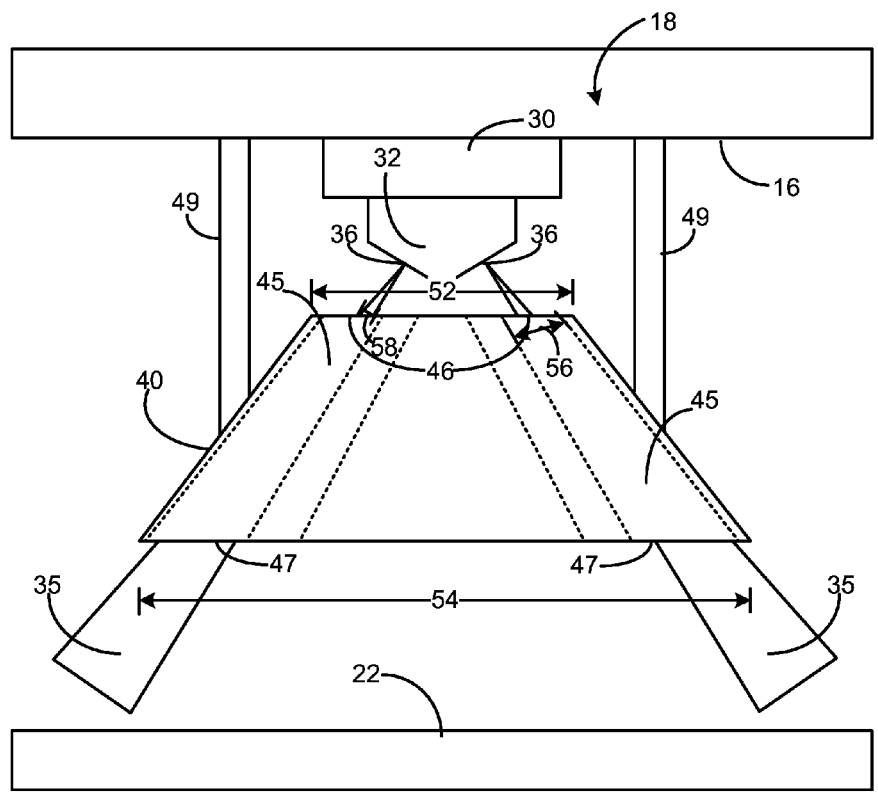
FIG. 3 is a side view of a generally conical shaped duct structure that defines a plurality of ducts for use within the cylinder(s) of FIGS. 1 and 2, in accordance with an embodiment of the disclosure.
Figure 4:
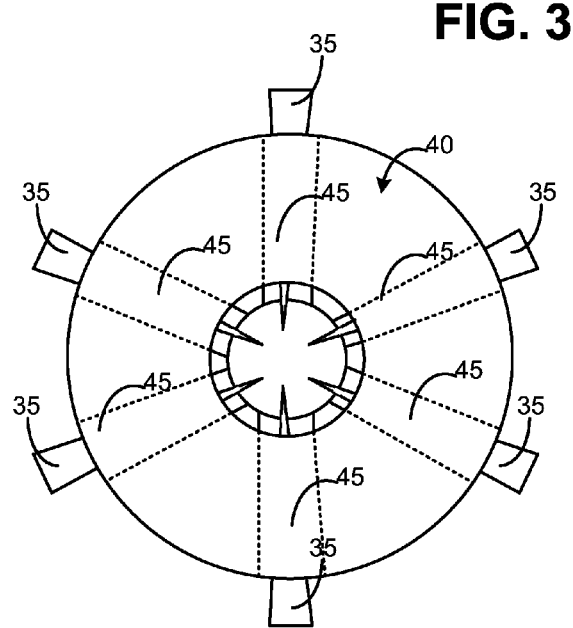
FIG. 4 is a top view of the generally conical shaped duct structure of the embodiment of FIG. 3, shown from above the ducts and an associated fuel injector, in accordance with the embodiment of FIG. 3 and the present disclosure.
Figure 5:
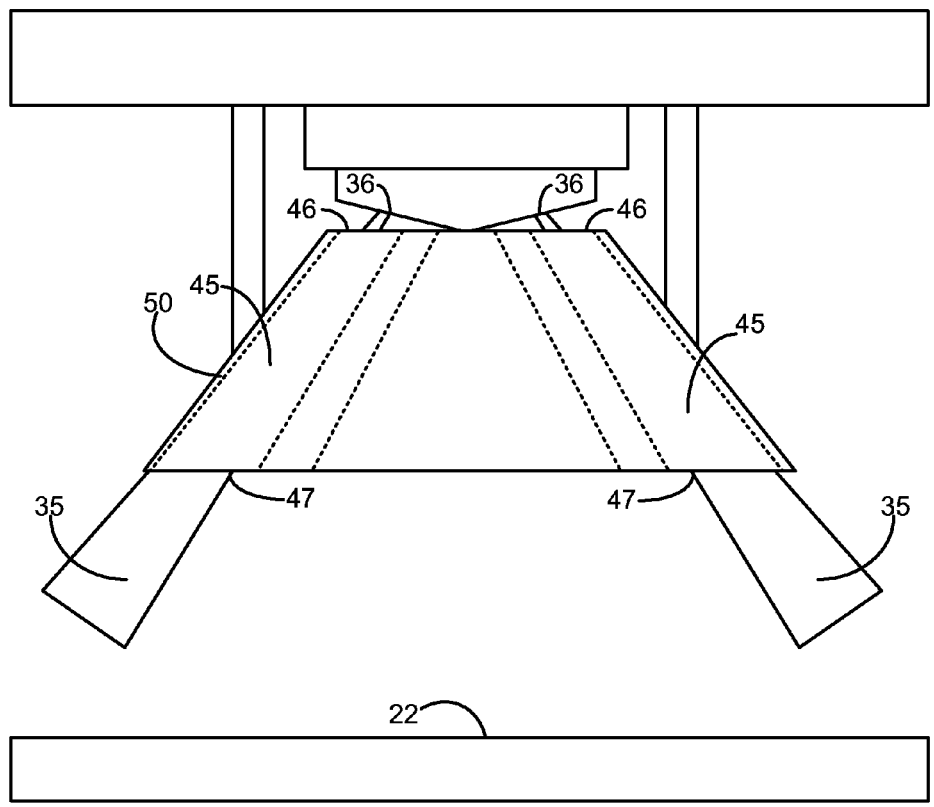
FIG. 5 is a side view of a generally conical shaped duct structure defining a plurality of ducts, disposed adjacent to orifices in a fuel injector, for use within the cylinder(s) of FIGS. 1 and 2, in accordance with another embodiment of the disclosure.

To further illustrate the duct structure 40 and its interaction with one or more fuel jets 35 injected from the one or more orifices 36 of the tip 32 of the fuel injector 30, the duct structure 40, within the combustion chamber 14, is shown in greater detail in FIGS. 3 and 4. As shown, the plurality of ducts 45 are defined within the duct structure 40 as, for example, bores within the duct structure 40. Upon being injected out of the one or more orifices 36, the fuel jets 35 may enter the ducts 45 at duct openings 46 and may flow through the ducts 40 to duct outlets 47. In some examples, duct structure 40 may be positioned and/or supported within the combustion chamber 14 by a support structure 49. The support structure 49 may be any mounting, wiring, or other positioning device suitable for positioning the duct structure 40 within the combustion chamber 14. In some examples, such as the duct structure 50 shown in FIG. 5, the duct structure 50 may be positioned with the openings 46 directly affixed to the cylinder head 18 and/or the fuel injector 30, such that the ducts 45 of the duct structure 50 are aligned with the orifices 36. In such examples, the support structure 49 may not be necessary.

As mentioned above, the duct structure 40 may have a generally conical shape. In an example embodiment, the duct structure 40 may have a first radius 52 proximate to the plurality of duct openings 46 and a second radius 54 proximate to the plurality of duct outlets 47. To provide a conical shape for the duct structure 40, the second radius 54 may be greater than the first radius 52.

Further, the ducts 45 may be configured such that the plurality of fuel jets 35 substantially enters the ducts 45 in their entirety upon injecting from the plurality of orifices 36. The openings 46 may have an opening width 56, while each of the plurality of fuel jets 35 may have a jet width 58. To ensure that most of, if not all of, the fuel of the fuel jets 35 enter the ducts 45 upon being injected, the opening widths 56 of the openings 46 may be greater than the jet widths 58.

Use of the duct structure 40 may provide greater mixing of a fuel/air mixture within the fuel jets 35 prior to combustion. The duct structure 40 may direct combustion away from the fuel injector 30, such that longer flame lift-off lengths may be achieved. Further, by channeling the fuel jets 35 into the duct structure 40, entrainment of combustion products from downstream regions of the same or neighboring fuel jets 35 may be inhibited or reduced. By using such duct structures 40, levels of soot within the combustion chamber 14, may be reduced greatly.

Figure 6:
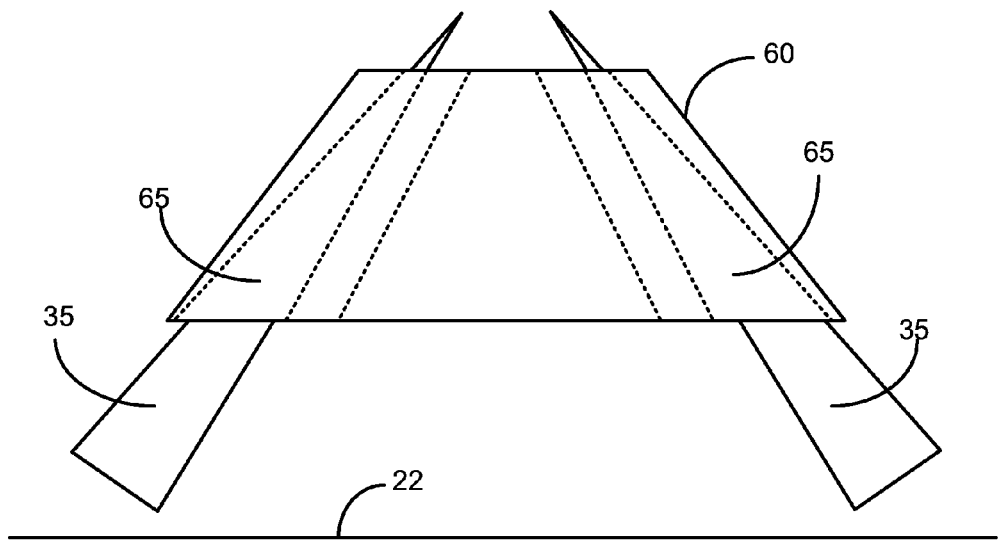
FIG. 6 is a side view of a generally conical shaped duct structure defining a plurality of ducts that diverge in a flow direction of the fuel jet within the cylinder(s) of FIGS. 1 and 2, for use within the cylinder(s) of FIGS. 1 and 2 and in accordance with another embodiment of the disclosure.

In some example embodiments of duct structures disclosed herein, the structures of said ducts may converge and/or diverge in a flow direction of the fuel jets 35. Beginning with the embodiment shown in FIG. 6, a generally conical shaped duct structure 60 is shown having a plurality of divergent ducts 65 defined therein, wherein the divergent ducts 65 of the duct structure 60 diverge in a flow direction of the fuel jets 35. "Divergence in a flow direction of the fuel jets," as defined herein with reference to ducts, generally refers to a duct having a width that increases along the length of the duct in the general direction of the flow of the fuel jets 35. Using divergent ducts 65 within the duct structure 60 may alter the dispersion of the fuel jets 35, which may have an effect on flame lift-off length and/or may provide a substantially uniform fuel/air mixture within the fuel jets 35.

Figure 7:
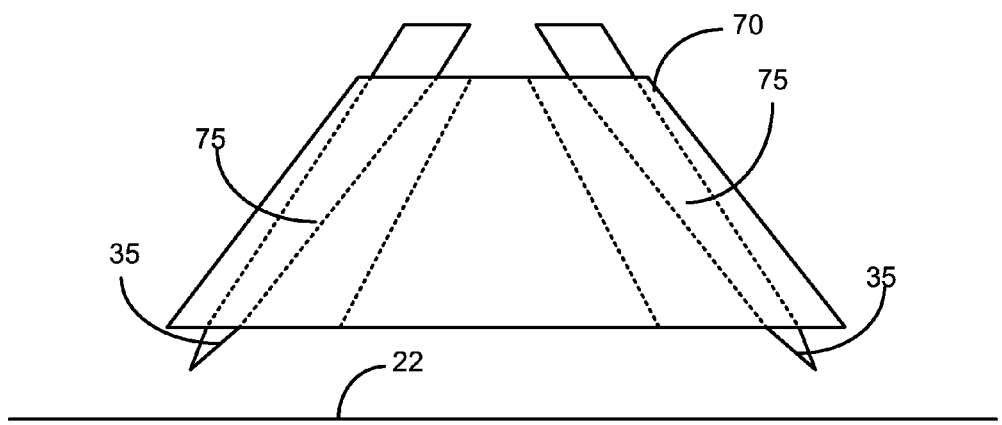
FIG. 7 is a side view of a generally conical shaped duct structure defining a plurality of ducts that converge in a flow direction of a fuel jet within the cylinder(s) of FIGS. 1 and 2, for use within the cylinder(s) of FIGS. 1 and 2 and in accordance with another embodiment of the disclosure.

Alternatively, as shown in FIG. 7, a duct structure 70 may have convergent ducts 75, wherein the convergent ducts 75 of the duct structure 70 converge in a flow direction of the fuel jets 35. "Converge in a flow direction of the fuel jets," as defined herein with reference to ducts, generally refers to a duct having a width that decreases along the length of the structure in the general direction of the flow of the fuel jets 35. Using convergent ducts 75 within the duct structure 70 may alter the dispersion of the fuel jets 35, which may have an effect on flame lift-off length and/or may provide a substantially uniform fuel/air mixture within the fuel jets 35.

Figure 8:
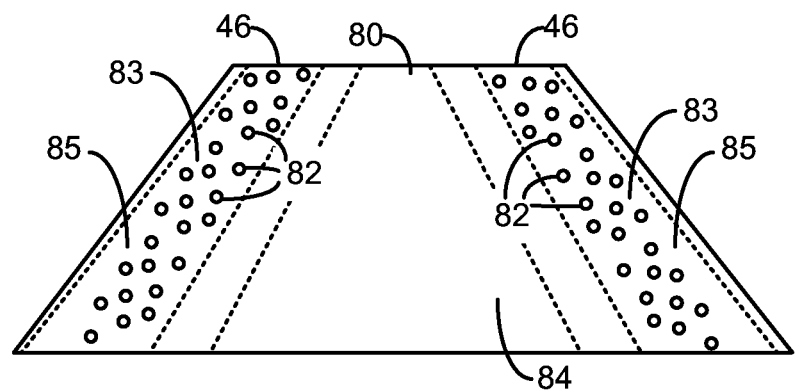
FIG. 8 is a side view of a generally conical shaped duct structure defining a plurality of ducts, the ducts having a duct wall defining a plurality of perforations, for use within the cylinder(s) of FIGS. 1 and 2 and in accordance with another embodiment of the disclosure.

The structure of the ducts in a ducted combustion system may include other modifications to alter the fuel/air mixture either within the duct or outside of the duct. For example, FIG. 8 shows an embodiment of a duct structure 80 which includes a plurality of perforations 82 defined on duct walls 83 of ducts 85. The duct structure 80 may have an outer surface 84, on which the duct walls 83 are defined. The perforations 82 may allow additional air into the duct when the fuel jets 35 are injected into the openings 46. The additional air provided via the perforations 82 may provide a more uniform air/fuel mixture within the fuel jets 35, which may, in turn, reduce soot within the combustion chamber 14 during combustion and lower emissions caused by combustion.

Figure 9:
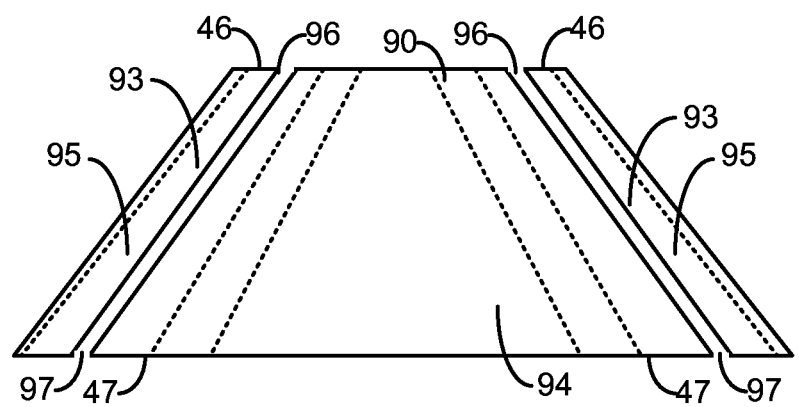
FIG. 9 is a side view of a generally conical shaped duct structure defining a plurality of ducts, the ducts having a duct wall defining a slit, for use within the cylinder(s) of FIGS. 1 and 2 and in accordance with another embodiment of the disclosure.

For further fuel/air mixing within ducts, the embodiment of FIG. 9 includes a duct structure 90 having a plurality of ducts 95, each of the ducts 95 defining at least one slit 92. The slit 92 may be defined on duct walls 83, which are defined by an outer surface 94 of the duct structure 90. While the ducts are shown each having one slit 92 extending from first slit ends 96 proximate to the duct openings 46 to second slit ends 97 proximate to the duct outlets 47, slits 92 may be of any length, encompassing any portion of the ducts 95. Further, while only one slit 92 is shown on duct 95, more than one slit 92 having similar or different dimensions are certainly possible. The slits 92 on ducts 95 allow air to enter the sides of ducts 95 during fuel injection; therefore, slits 92 on the ducts 95 may provide for a more uniform air/fuel mixture within the fuel jets 35, which may, in turn, reduce soot within the combustion chamber 14 during combustion and may lower emissions caused by combustion.

Figure 10:
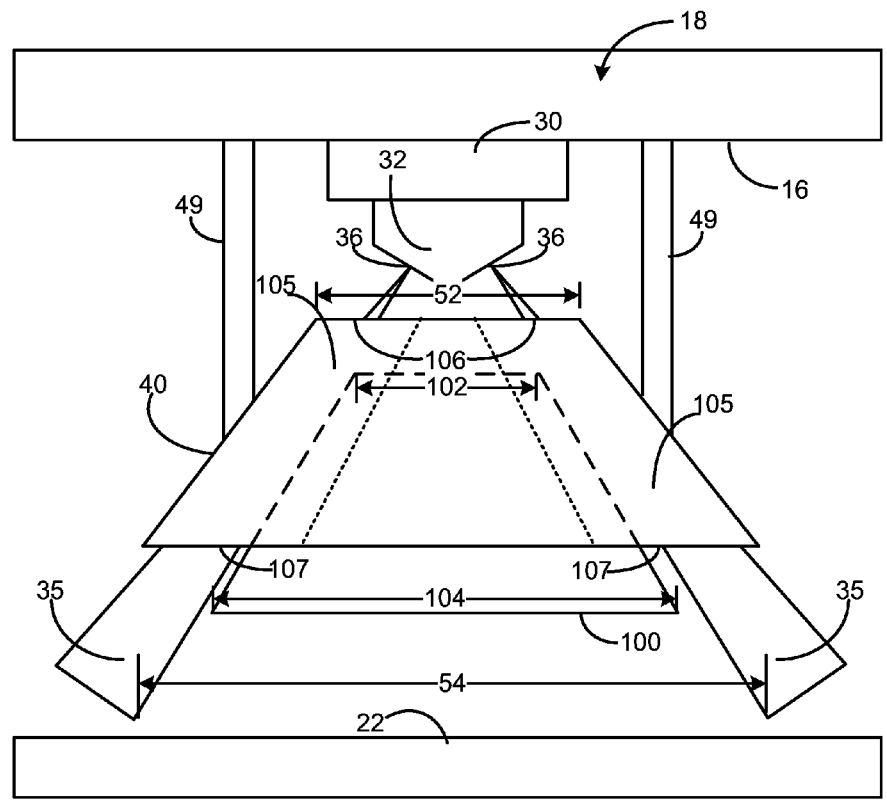
FIG. 10 is a side view of a generally conical shaped duct structure, including two conical structures that define a plurality of ducts for use within the cylinder(s) of FIGS. 1 and 2, in accordance with an embodiment of the disclosure.

In another embodiment shown in FIG. 10, the conical disc structure 40 is shown having a second disc structure 100 disposed concentric to the conical disc structure 40. In such examples, the conical disc structure 40 may be partially hollowed such that the second disc structure 100 may fit within a hollowed cavity of the conical disc structure 40. Space within the conical disc structure 40 and outside of the surfaces of the second disc structure 100 may define a plurality of ducts 105. The second disc 100 may have a third radius 102 proximate to openings 106 of the ducts 105, the third radius 102 being less than the first radius 52. Further, the second disc 100 may have a fourth radius 104 proximate to outlets 107 of the ducts 105, the fourth radius 104 being less than the second radius 54. The conical disc 40 and the second disc 100 may be connected by any support structure, such as, but not limited to, the support structure 49.

Figure 11:
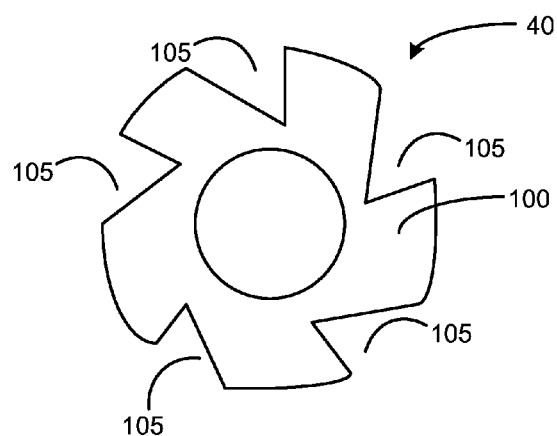
FIG. 11 is a top view of the generally conical shaped duct structure of the embodiment of FIG. 10 having a radius with respect to a fuel injector, the radius varying with the circumferential position, as shown from above, in accordance with the embodiment of FIG. 10 and the present disclosure.

The ducts 105 may be continuous about the radii of the disc structures 40, 100. Alternatively, the conical disc structure 40 may vary in radius with respect to circumferential position around the disc, such that there is variation in the length of the duct 105. FIG. 11 shows an effective top view of an embodiment of the duct structure 40, having a second disc 100. The space between the conical disc structure 40 and the second conical disc structure 100 may be large enough so that one or both conical disc structures 40, 100 can be rotated about an injector 30 axis while still allowing the fuel jets to pass between the conical disc structures 40, 100. Having variation in disc radius with respect to circumferential position in one or both of the conical disc structures 40, 100 and the ability to rotate one or both conical disc structures 40, 100 with respect to the injector 30 enables controlled variation in the length of the ducts 105, in which the fuel jets 35 flow between the conical disc structures 40, 100.

Figure 12:
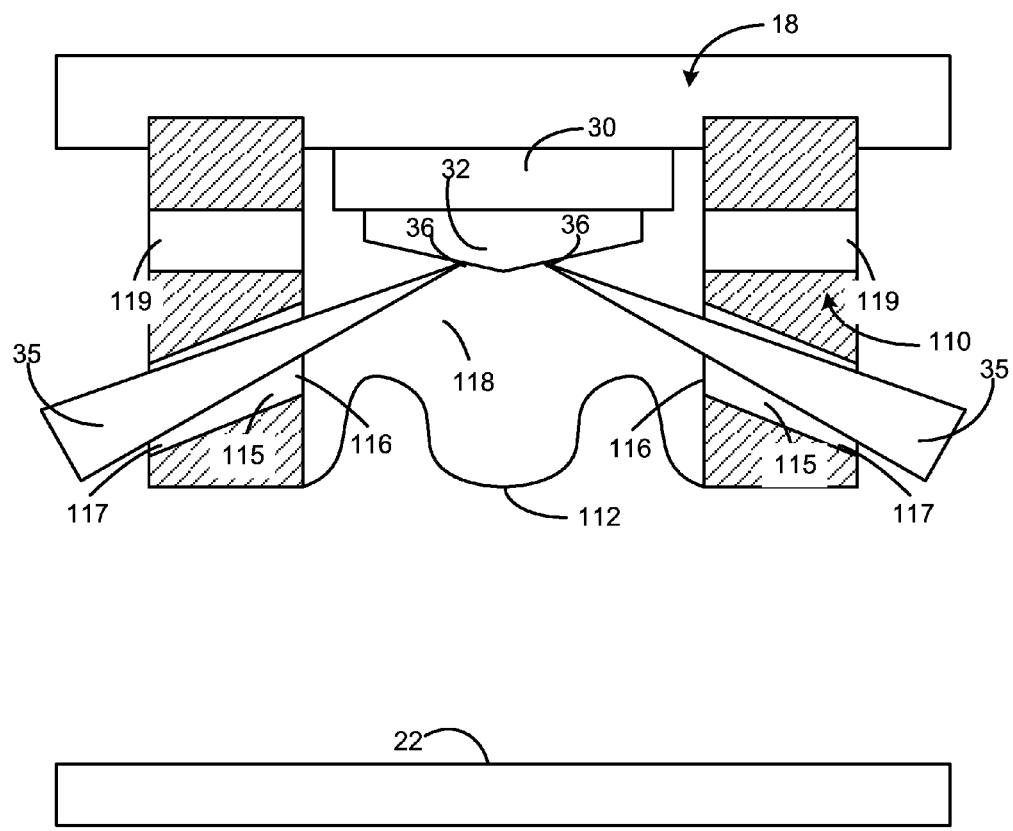
FIG. 12 is a side view of a generally ring shaped duct structure that defines a plurality of ducts for use within the cylinder(s) of FIGS. 1 and 2 and has a generally wave-shaped bottom, in accordance with an embodiment of the disclosure.

FIG. 12 shows an embodiment of a duct structure 110, shown in a cross-sectional view, which is generally ring shaped and attached to at least one of the fuel injector 30 or the cylinder head 18. Walls of the ring shaped duct structure 110 may define a plurality of ducts 115 that extend radially outward in a flow direction of the fuel jets 35. The ducts 115 may be configured to be aligned with the orifices 36, such that the fuel jets 35 are directed into duct openings 116 and the fuel jets 35 exit the duct structure 110 at duct outlets 117. The ducts 115 may be generally tubular bores, may be converging in shape, may be diverging in shape, and/or may converge and diverge in part.

Further, the ring shaped duct structure 110 may have a generally wave-shaped bottom 112. The generally wave-shaped bottom 112 may allow increased access of air to the ducts 115 of the ring shaped duct structure 110. In some examples, the ring shaped duct structure 110 may have perforations 119. The additional perforations and the generally waved shaped bottom 112 may allow increased air flow to an inner cavity 118 of the ring shaped duct structure 110. By increasing air access, optimized air/fuel mixing may be provided in one or both of the combustion chamber 14 and the fuel jets 35.

INDUSTRIAL APPLICABILITY

The present disclosure relates generally to internal combustion engines and, more specifically, to ducted combustion systems. While the present disclosure shows the embodiments as related to internal combustion engines having reciprocating pistons, the teachings of the disclosure are certainly applicable to other combustion systems, which utilize diffusion or non-premixed flames, such as gas turbines, industrial burners, and the like. As discussed above, the various arrangements of ducts and their related elements are useful in promoting a substantially uniform fuel/air mixture within fuel jets and may inhibit or reduce entrainment of recirculated combustion products from downstream regions into upstream regions of fuel jets injected into combustion chambers. However, using such systems and methods for ducted combustion may also decrease fuel/air mixing, while reducing equivalence ratio at the lift-off length.

Figure 13:
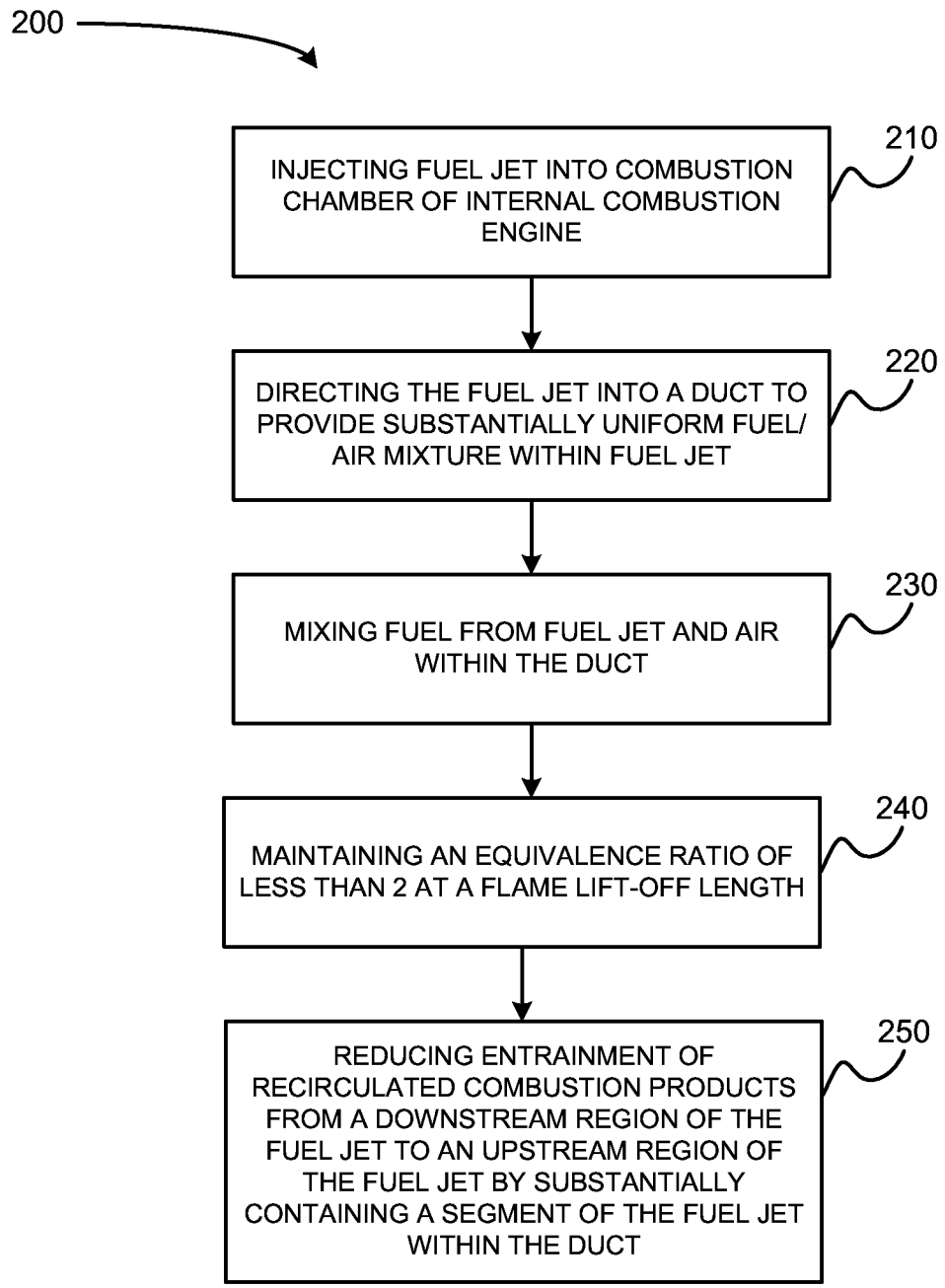
FIG. 13 is a block diagram of a flowchart representative of a method for operating a combustion system, in accordance with an embodiment of the disclosure.

An example method utilizing the ducted combustion systems shown in FIGS. 1-12 and described above is exemplified in the flowchart of FIG. 13, which represents a method 200 for operating a combustion system. The method 200 begins at block 210, by injecting a plurality of fuel jets 35 into the combustion chamber 14 of the internal combustion engine 10. The fuel jets 35 may be directed into the plurality of ducts 45 defined by the duct structure 40, to provide a substantially uniform fuel/air mixture within the fuel jets 35, as shown in block 220. While the present description of block 220 refers to the duct structure 40 of FIGS. 3 and 4, the block 220 and/or the method 200 may employ any of the duct structures shown above in FIGS. 3-12.

In some examples, the method 200 may include mixing the fuel of the fuel jets 35 with air while the fuel jets 35 are passing through the ducts 45, as shown in block 230. Mixing air and fuel within a duct may be accomplished by utilizing one or more of the following: the duct structure 80 defining a plurality of ducts 85 which have duct walls 84 that define a plurality of perforations 62 (FIG. 8), the duct structure 90 defining a plurality of ducts 95 having a duct wall 94 that defines at least one slit 92 (FIG. 9), the duct structure 40 including a second conical disc structure 100 (FIGS. 10-11), and the ring shaped duct structure 110 having a generally wave-shaped bottom 112 (FIG. 12). Of course, other modifications to the duct structure 40 which allow air to enter the ducts 45 when the fuel jets 35 enter the ducts 45 are certainly possible.

The disclosed ducted combustion systems may be configured to use the one or more ducts 45 to direct combustion away from the fuel injector tip 32, so that the equivalence ratio at the flame lift-off length, produced during combustion, is lower. Using the one or more ducts 45, greater uniformity of equivalence ratio within the fuel jets 35 may be achieved. Maintaining a reduced equivalence ratio at the lift-off length may reduce soot formation. Achieving a reduced equivalence ratio at the lift-off length may be accomplished by altering the lift-off length, when employing any of the aspects of the present application. Alterations to the lift-off length may occur if heat is transferred from the fuel/air mix of the fuel jets 35 to the duct structure 40. Additionally or alternatively, alterations to the lift-off length may be achieved by alteration of fuel jet fluid dynamics, which are resultant of characteristics of the ducts 45. Further, use of ducts 45 may prevent lift-off length recession by acting as a flame arrester.

Substantially soot-free combustion may be achieved if the equivalence ratio at the flame lift-off length is less than two. Therefore, at block 240, the method 200 may include maintaining an equivalence ratio of less than two at the flame lift-off length.

At block 250, the method 200 may reduce entrainment of recirculated combustion products from a downstream region of the fuel jet 35 to an upstream region of the fuel jet 35 by substantially containing a segment of the fuel jet 35 within a duct 45. Reducing such entrainment may lead to an overall reduction in soot production within the combustion chamber 14 and may lead to greater overall efficiency of the internal combustion engine 10. Presence of ducts 45 may alter amount and position of entrainment of recirculated combustion products, within the fuel jets 35

It will be appreciated that the present disclosure provides ducted combustion systems, internal combustion engines utilizing ducted combustion, and methods for operating combustion systems utilizing ducted combustion. While only certain embodiments have been set forth, alternatives and modifications will be apparent from the above description to those skilled in the art. These and other alternatives are considered equivalents and within the spirit and scope of this disclosure and the appended claims.

What is claimed is:

1. A ducted combustion system, comprising:
    a combustion chamber defined as an enclosure bound at a first end by a flame deck surface of a cylinder head of an internal combustion engine, and bound at a second end by a piston top surface of a piston disposed within the internal combustion engine;
    a fuel injector in fluid connection with the combustion chamber and including a plurality of orifices in an injector tip of the fuel injector, the plurality of orifices injecting fuel into the combustion chamber as a plurality of fuel jets; and
    a generally conical duct structure defining a plurality of ducts and disposed within the combustion chamber between the flame deck surface and the piston top surface, the plurality of ducts being disposed such that each of the plurality of fuel jets at least partially enters one of the plurality of ducts upon being injected into the combustion chamber.

2. The ducted combustion system of claim 1, wherein the duct structure has an outer surface, the outer surface defining a slit.

3. The ducted combustion system of claim 1, wherein at least one of the plurality of ducts has an opening width and at least one of the plurality of fuel jets has a jet width when each of the plurality of fuel jets at least partially enters one of the plurality of ducts upon being injected into the combustion chamber, and wherein the opening width is greater than the jet width.

4. The ducted combustion system of claim 1, wherein the generally conical disc structure of the duct structure includes a first disc having a first radius at openings of the plurality of ducts and a second radius at an outlet of each of the plurality of ducts, the second radius being greater than the first radius.

5. The ducted combustion system of claim 1, wherein the duct structure is positioned in direct alignment with the plurality of orifices.

6. The ducted combustion system of claim 4, wherein each of the plurality of ducts has an opening and each of the openings is positioned in alignment with one of the plurality of orifices.

7. The ducted combustion system of claim 4, wherein the generally conical shaped disc structure includes a second disc, the second disc having a third radius proximate to the openings of the plurality of ducts and a fourth radius proximate to the outlets of the plurality of ducts, the fourth radius being greater than the third radius, wherein the first radius is greater than the third radius;
wherein the second radius is greater than the fourth radius; and
wherein the ducts are defined as space between the first disc and the second disc.

8. The ducted combustion system of claim 7, wherein at least one of the generally conical disc structure and the second disc has a radius that varies with respect to a circumferential position of the generally conical disc structure and able to be rotated about an injector axis.

9. The ducted combustion system of claim 1, wherein the duct structure has an outer surface, the outer surface defining a plurality of perforations.

10. The ducted combustion system of claim 9, wherein the outer surface has a plurality of duct walls, each of the plurality of duct walls defining a wall of one of the plurality of ducts, and wherein each of the plurality of perforations is defined on one of the plurality of duct walls.

11. An internal combustion engine, comprising:
an engine block having at least one cylinder bore;
a cylinder head having a flame deck surface disposed at one end of the cylinder bore;
a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface;
a fuel injector in fluid connection with the combustion chamber and including a plurality of orifices in an injector tip of a fuel injector, the plurality of orifices injecting fuel into the combustion chamber as a plurality of fuel jets; and
a duct structure defining a plurality of ducts and disposed within the combustion chamber between the flame deck surface and the piston top surface, the plurality of ducts being disposed such that each of the plurality of fuel jets at least partially enters one of the plurality of ducts upon being injected into the combustion chamber, wherein the duct structure is a generally conical disc structure.

12. The internal combustion engine of claim 11, wherein at least one of the plurality of ducts has an opening width and at least one of the plurality of fuel jets has a jet width when each of the plurality of fuel jets at least partially enters one of the plurality of ducts upon being injected into the combustion chamber, and wherein the opening width is greater than the jet width.

13. The internal combustion engine of claim 11, wherein the generally conical disc structure of the duct structure includes a first disc having a first radius at openings of the plurality of ducts and a second radius at outlets of the plurality of ducts, the second radius being greater than the first radius.

14. The internal combustion engine of claim 13, wherein the generally conical shaped disc structure includes a second disc, the second disc having a third radius proximate to the openings of the plurality of ducts and a fourth radius proximate to the outlets of the plurality of ducts, the fourth radius being greater than the third radius, wherein the first radius is greater than the third radius;
wherein the second radius is greater than the fourth radius; and
wherein the ducts are defined as space between the first disc and the second disc.

15. A method for operating a combustion system, comprising:
injecting a plurality of fuel jets into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine;
directing each of the plurality of fuel jets, at least partially, into respective members of a plurality of ducts, each of the plurality of ducts being defined within a generally conical shaped duct structure, to provide a substantially uniform mixture of fuel and air within each of the plurality of fuel jets.

16. The method of claim 15, further comprising mixing fuel from the plurality of fuel jets and air within the plurality of ducts, once the plurality of fuel jets has entered the plurality of ducts.

* * * * *